US011866195B2

(12) United States Patent
Yuksel et al.

(10) Patent No.: US 11,866,195 B2
(45) Date of Patent: Jan. 9, 2024

(54) METHOD AND SYSTEM FOR MONITORING A CONDITION OF A VTOL-AIRCRAFT

(71) Applicant: Volocopter GmbH, Bruchsal (DE)

(72) Inventors: Burak Yuksel, Heidelberg (DE); Tobias Vermeulen, Munich (DE)

(73) Assignee: Volocopter GmbH, Bruchsal (DE)

( * ) Notice: Subject to any disclaimer, the term of this patent is extended or adjusted under 35 U.S.C. 154(b) by 342 days.

(21) Appl. No.: 17/130,199

(22) Filed: Dec. 22, 2020

(65) Prior Publication Data

US 2021/0245893 A1  Aug. 12, 2021

(30) Foreign Application Priority Data

Feb. 10, 2020 (EP) ..................................... 20156354

(51) Int. Cl.
*B64D 45/00* (2006.01)
*B64C 29/00* (2006.01)
(Continued)

(52) U.S. Cl.
CPC .......... *B64D 45/0005* (2013.01); *B64C 29/00* (2013.01); *B64D 27/24* (2013.01);
(Continued)

(58) Field of Classification Search
CPC .... B64D 45/0005; B64D 27/24; B64D 31/00; B64D 2045/0085; B64D 45/00;
(Continued)

(56) References Cited

U.S. PATENT DOCUMENTS 5,615,119 A    3/1997 Vos
7,031,812 B1   4/2006 Pettigrew
(Continued)

FOREIGN PATENT DOCUMENTS

CN    107273561 A    10/2017
CN    109460052 A    3/2019
(Continued)

OTHER PUBLICATIONS

Rago, C. et al., "Failure detection and identification and fault tolerant control using the IMM-KR with applications to the Eagle-Eye UAV", Decision and Control, 1998. Proceedings of the 37th IEEE Conference on Tampa, FL., vol. 4, pp. 4208-4213, Dec. 16, 1998.

(Continued)

*Primary Examiner* — Donald J Wallace
*Assistant Examiner* — Jalal C Coduroglu
(74) *Attorney, Agent, or Firm* — Volpe Koenig

(57) ABSTRACT

A method for monitoring a condition of a VTOL-aircraft (1), preferably an electrically propelled, more particularly an autonomous, more particularly a multi-rotor aircraft, with a plurality of spatially distributed actuators (2i, 2o), preferably propulsion units, wherein a primary control (4.1) is used for controlling a flight state of the VTOL-aircraft (1) and at least one secondary control (4.2) is used for controlling the actuators (2i, 2o) of the VTOL-aircraft (1), preferably the propulsion units (2i, 2o); during operation. The primary control (4.1) generates a primary data set, which is subject to a first uncertainty, and is entered into an estimation algorithm, and the secondary control generates a secondary data set, which is subject to a second uncertainty, and is also entered into the estimation algorithm. The estimation algorithm processes the primary and secondary data sets and generates an estimation result that is representative of a condition of the VTOL-aircraft (1), preferably a health status of at least one actuator (2i, 2o), which estimation result is subject to a third uncertainty that is equal to or lower than the first uncertainty and/or the second uncertainty.

20 Claims, 9 Drawing Sheets

(51) Int. Cl.
*B64D 27/24* (2006.01)
*B64D 31/00* (2006.01)
*G05D 1/10* (2006.01)

(52) U.S. Cl.
CPC ............. *B64D 31/00* (2013.01); *G05D 1/102* (2013.01); *B64D 2045/0085* (2013.01)

(58) Field of Classification Search
CPC ........... B64D 1/00; B64C 29/00; B64C 27/20; B64C 39/024; B64C 1/00; G05D 1/102; G05D 1/0072; G05D 1/0055; B64U 2201/10; B64U 10/13; B64U 30/20; B64U 50/19; B64F 5/60; B64F 1/00; G05B 23/0243; G05B 2219/45071; G05B 21/00; G05B 19/00; G05B 23/02; Y02T 50/60; B64B 1/00; B60V 1/00
See application file for complete search history.

(56) References Cited

U.S. PATENT DOCUMENTS

| | | | |
|---|---|---|---|
| 2007/0030174 A1 | 2/2007 | Randazzo et al. | |
| 2010/0131121 A1 | 5/2010 | Gerlock | |
| 2010/0152925 A1 | 6/2010 | Goupil et al. | |
| 2011/0202291 A1 | 8/2011 | Hickman | |
| 2012/0101663 A1* | 4/2012 | Fervel | B64C 13/505 701/3 |
| 2014/0236390 A1* | 8/2014 | Mohamadi | B64D 47/08 701/16 |
| 2014/0365039 A1* | 12/2014 | Schaeffer | B64C 27/54 701/3 |
| 2015/0081156 A1* | 3/2015 | Trepagnier | G05D 1/0248 701/26 |
| 2015/0203215 A1 | 7/2015 | Falangas | |
| 2016/0272300 A1* | 9/2016 | Matsui | B64C 13/505 |
| 2017/0069145 A1 | 3/2017 | Dorkel et al. | |
| 2017/0369190 A1 | 12/2017 | Ethington et al. | |
| 2018/0093762 A1 | 4/2018 | Shue et al. | |
| 2018/0096611 A1 | 4/2018 | Kikuchi et al. | |
| 2018/0297573 A1 | 10/2018 | Alam et al. | |
| 2018/0300191 A1* | 10/2018 | Bengea | G06F 11/07 |
| 2018/0334244 A1* | 11/2018 | Cherepinsky | B64C 13/18 |
| 2018/0334245 A1 | 11/2018 | Grohmann et al. | |
| 2018/0362190 A1* | 12/2018 | Chambers | B64C 39/024 |
| 2019/0033888 A1 | 1/2019 | Bosworth et al. | |
| 2019/0108691 A1 | 4/2019 | Tucker et al. | |
| 2019/0179345 A1* | 6/2019 | McEwan | G01C 21/18 |
| 2019/0283865 A1* | 9/2019 | Mueller | B64C 39/024 |
| 2020/0241565 A1* | 7/2020 | Bosworth | G06V 20/59 |
| 2020/0241567 A1* | 7/2020 | Zwiener | B64D 31/04 |
| 2020/0339285 A1* | 10/2020 | Ma | G07C 5/0808 |
| 2021/0373581 A1* | 12/2021 | Shattil | H04B 7/18504 |
| 2022/0088804 A1* | 3/2022 | Spenninger | B25J 9/1638 |

FOREIGN PATENT DOCUMENTS

| | | |
|---|---|---|
| CN | 110612432 A | 12/2019 |
| DE | 102015008754 A1 | 1/2017 |
| EP | 2810872 A1 | 12/2014 |
| EP | 3403924 A1 | 11/2018 |
| FR | 2943036 A1 | 9/2010 |
| KR | 101818232 B1 | 1/2018 |
| KR | 101827955 B1 | 2/2018 |
| WO | 2014198642 A1 | 12/2014 |

OTHER PUBLICATIONS

Santos Milton Cesar Paes et al., "A Controller Based on PVTOL Control Signals for Guiding a Quadrotor in 3D Navigation Tasks", 2018 International Conference On Unmanned Aircraft Systems (ICUAS), IEEE, Jun. 12, 2018, pp. 639-646, XP033396676, DOI: 10.1109/ICUAS.2018.8453371.

* cited by examiner

METHOD AND SYSTEM FOR MONITORING A CONDITION OF A VTOL-AIRCRAFT

INCORPORATION BY REFERENCE

The following documents are incorporated herein by reference as if fully set forth: European Patent Application No. 20 156 354.1, filed Feb. 10, 2020.

TECHNICAL FIELD

The invention relates to a method for monitoring a condition of a VTOL-aircraft, preferably an electrically propelled, more particularly an autonomous, more particularly a multi-rotor VTOL-aircraft, with a plurality of spatially distributed actuators, preferably actuators in the form of propulsion units for generating propulsion forces and/or maintaining a spatial position of the VTOL-aircraft.

The invention also relates to a system for monitoring a condition of a VTOL-aircraft. Furthermore, the invention relates to a VTOL-aircraft.

BACKGROUND

A VTOL-aircraft comprises various safety critical systems such as its actuators. These actuators may include propulsion units that are used to generate thrust and/or torque to maneuver the aircraft or to reach a defined state during flight. To reach and maintain a safe flight condition, the VTOL-aircraft and its actuators need to be operated in a reliable manner, which includes the assessment of their present operating condition.

However, technical systems in general are subject to fatigue effects, especially toward the end of their scheduled lifecycle. Moreover, spontaneous failure may occur due to unforeseen, harsh operating conditions, leading to a decreased performance or operability of affected actuators. In these and any other cases, a decreased operability of the VTOL-aircraft or its actuators needs to be identified with a high reliability.

In order to determine a health status of the VTOL-aircraft or its actuators, it is possible to compare the actual run-/lifetime of an affected component to its nominal lifetime, which is defined by design and manufacturing of said component. However, this kind of assessment is bound to uncertainties and is seldom correct. Additionally, known methods for determining the presumably remaining time for the operation of aircraft components do not take into account how and to which extent said components are subject to stress during their operation. This results in a low reliability of the information that needs to be used to assess the condition of the VTOL-aircraft or its actuators.

Therefore, there is a need for providing a dynamic method and system with online-capability and with a higher reliability in determining the condition of a VTOL-aircraft, preferably of its actuators.

SUMMARY

This object is achieved by a method, by a system for monitoring a condition of a VTOL-aircraft, and by an aircraft having one or more features as described herein.

According to a first aspect of the invention, there is proposed a method for monitoring a condition of a VTOL-aircraft, preferably an electrically propelled, more particularly an autonomous (or piloted), more particularly a multi-rotor VTOL-aircraft, which aircraft comprises a plurality of spatially distributed actuators, preferably actuators in the form of propulsion units for generating propulsion forces and/or for maintaining a spatial position of the VTOL-aircraft, wherein a primary control is used for controlling a flight state of the VTOL-aircraft and at least one secondary control is used for controlling the actuators of the VTOL-aircraft, preferably the propulsion units; during operation of the VTOL-aircraft, the primary control generates a primary data set, which is subject to a first uncertainty, which primary data set is entered into an estimation algorithm, and the secondary control generates a secondary data set, which is subject to a second uncertainty, which secondary data set is also entered into the estimation algorithm; the estimation algorithm processes the primary data set and the secondary data set, and the estimation algorithm generates an estimation result, which estimation result is representative of a condition of the VTOL-aircraft, preferably representative of a health status of at least one actuator of the VTOL-aircraft, which estimation result is subject to a third uncertainty, which third uncertainty is equal to or lower than the first uncertainty and/or the second uncertainty.

According to a second aspect of the invention, there is proposed a system for monitoring a condition of a VTOL-aircraft, preferably an electrically propelled, more particularly an autonomous (or piloted), more particularly multi-rotor VTOL-aircraft, with a plurality of spatially distributed actuators, preferably actuators in the form of propulsion units for generating propulsion forces and/or for maintaining a spatial position of the VTOL-aircraft, wherein a primary control is configured to be used for controlling a flight state of the VTOL-aircraft and at least one secondary control is configured to be used for controlling the actuators of the VTOL-aircraft, preferably the propulsion units; during operation of the VTOL-aircraft, the primary control is configured to generate a primary data set, which is subject to a first uncertainty, and the secondary control is configured to generate a secondary data set, which is subject to a second uncertainty, the system comprising an estimation algorithm, which estimation algorithm receives both the primary data set and the secondary data set; the estimation algorithm is configured to process the primary data set and the secondary data set and the estimation algorithm is configured to generate an estimation result, which estimation result is representative of a condition of the VTOL-aircraft, preferably a health status of at least one actuator of the VTOL-aircraft, which estimation result is subject to a third uncertainty, which third uncertainty is lower than the first uncertainty and/or the second uncertainty.

According to a third aspect of the invention, a VTOL-aircraft (either autonomous or piloted) is proposed, which VTOL-aircraft comprises a system for monitoring its condition according to said second aspect of the invention.

Said condition of the VTOL-aircraft may be represented by its motion or its state during a flight. Actuators do particularly affect the dynamic properties of the VTOL-aircraft if they are operated with decreased power or performance. This may result in a decreased total thrust or torque that is required to perform a maneuver or to keep the aircraft in stable flight. The term "actuators" includes all components that are involved in the generation or establishment of a movement or of a (physical) state of the VTOL-aircraft, comprising (without limitation) an electrical engine (motor), a transmission, a propeller (rotor) and/or a turbine.

Therefore, a dynamic state of the VTOL-aircraft or the operation parameters of its actuators, especially its propulsion units, can be linked to the condition of the VTOL-aircraft.

The relationship between the motion or state of a VTOL-aircraft and the forces and torques that are acting on it can be described by an equation of motion. The equation of motion can be derived using, e.g., the Newton-Euler or Lagrange principle and comprises terms that represent external forces and torques acting on the body of the VTOL-aircraft. It may have the following form:

$$M(x)\ddot{x}+c(x,\dot{x})+g(x)+G(x)u_p=w_{ext}.$$

According to the equation of motion, $x \in \mathbb{R}^c$ is a c-dimensional configuration vector of the system, e.g., representing the position and/or rotation of a VTOL-aircraft in 3-dimensional space. $M(x) \in \mathbb{R}^{c \times c}$ is a state dependent generalized moment of inertia. $c(x,\dot{x}) \in \mathbb{R}^c$ is the state dependent Coriolis (or other internal velocity/rate dependent) force, $g(x) \in \mathbb{R}^c$ represents the gravitational forces. $w_{ext} \in \mathbb{R}^c$ is an external wrench, comprising external forces and torques, e.g., due to aerodynamics, physical contact (collision) etc., acting on the VTOL-aircraft. $u_p \in \mathbb{R}^q$ is a pseudo-control input, comprising desired accelerations to manoeuver the VTOL-aircraft. $G(x)$ is a control input matrix, comprising information of, e.g., under-actuation, where the system is said to be under-actuated if $\text{rank}(G(x))<c$.

By using the equation of motion, it is possible to determine a spatial and temporal behaviour of the VTOL-aircraft according to the forces and torques that are acting on its Center of Gravity (CoG). This requires determination of the dynamic/variable terms of the equation of motion, especially accelerations $\ddot{x}$ or velocities $\dot{x}$, but also external wrench $w_{ext}$ and pseudo-input $u_p$.

Some of the terms that need to be determined and are mentioned above can be determined directly, e.g., by measuring the velocities $\dot{x}$ and/or the accelerations $\ddot{x}$ of the body of the VTOL-aircraft using sensors such as inertia measurement units (IMUs), global navigation satellite systems, cameras, lidar, radar and the like.

Other terms, e.g., the control-input $u_p$ or the external wrench $w_{ext}$ may need to be determined indirectly, either because they cannot be measured directly or because their measurement involves a high effort in terms of sensor availability.

Pseudo-control input $u_p$ comprises a set of one or more forces and one or more torques that is/are required to maneuver the VTOL-aircraft according to a pilot signal or the signal of a navigation system. $u_p$, however, is a term that is used for the characterisation of an ideal kinematic description of forces and torques for the operation of the VTOL-aircraft. In fact, the forces and torques that are resulting from said actuators are acting in spatially distributed locations. Therefore, an actual control input $u \in \mathbb{R}^t$ that is necessary to operate the VTOL-aircraft needs to be generated. The pseudo-control input $u_p$ has therefore to be considered as a desired control vector, while the control input u is actually used to influence the actors in order to adjust thrust and torques generated by them.

To underline the difference between the pseudo-control input $u_p$ and the control input u, the following relations can be considered: For an underactuated VTOL-aircraft, it is common that q=4, i.e. $u_p=[u_t u_\tau^T]^T \in \mathbb{R}^4$. $u_t$ is the collective thrust and $u_T=[\tau_x,\tau_y,\tau_z]^T \in \mathbb{R}^3$ are the three control torques acting on the body-fixed frame and around the principle body axes of the VTOL-aircraft. Therefore $u_p$ consists of four entries. The control input u, however, represents the thrust and torques provided by all actuators of the VTOL-aircraft. For a VTOL-aircraft with 18 actuators, u accordingly is a vector with 18 entries, each entry representing the actuation of one actuator.

The relation between u and $u_p$ is given by $$u_p=Du,$$

where $D \in \mathbb{R}^{q \times t}$ is defined as an allocation matrix. Using state feedback control laws based on the system dynamics, $u_p$ can be computed and mapped to the physical actuators of actual control inputs u. Hence, a sort of inverse matrix computation is needed in order to compute u from $u_p$. This is done according to the equation $$u=D^{-1}(W)u_p,$$

where w is a weighting matrix, representing a distribution of forces and torques to be generated by the actuators.

Another term of the equation of motion that needs to be determined is $w_{ext}$. As mentioned above, the term $w_{ext}$ represents external forces and torques (external wrench) that are acting on the VTOL-aircraft. The estimation or determination of $w_{ext}$ may be performed by using external disturbance observers. An external disturbance observer is a method for estimating unmodeled, unexpected forces and torques $\hat{w}_{ext}$ acting on a VTOL-aircraft.

External disturbance observers may require a model of the system in accordance to the equation of motion, sensor measurements (inertial measurement units—IMUs., global navigation satellite systems, cameras, etc.) that allow the determination of accelerations and/or velocities, and already computed control inputs, such as the control input u.

Using, e.g., a known momentum-based external wrench estimation for a VTOL-aircraft, the following equations allow the determination of an external wrench with a known system model, sensor data and control inputs.

$$a_{b,f}=(I-K_f)a_{b,f}+K_f a_b$$

$$\hat{f}_{ext}=a_{b,f}m-u_t$$

$$\hat{\tau}_{ext}=K_\tau(J\omega-\int_0^t+J\omega\times\omega+\tau ext)ds).$$

$K_f \in \mathbb{R}^{3\times3}$ and $K_\tau \in \mathbb{R}^{3\times3}$ are observer gains (implementing a low-pass filter behavior) for forces and torques, respectively. The moment of inertia is depicted as $J \in \mathbb{R}^{3\times3}$, rotational velocities of the body as $\omega \in \mathbb{R}^3$, accelerations are given by $a_b \in \mathbb{R}^3$ and their low-pass filtered version by $a_{b,f}$. The external thrust is represented by $\hat{f}_{ext}$, and the external torques are represented by $\hat{\tau}_{ext}$ comprising $\tau_{ext,x}$; $\tau_{ext,y}$; $\tau_{ext,z}$. The estimated external wrench $\hat{w}_{ext}$ therefore can be combined to one vector $$\hat{w}_{ext}=[f_{ext,z},\tau_{ext,x},\tau_{ext,y},\tau_{ext,z}]^T \in \mathbb{R}^4$$

A condition of the VTOL-aircraft and/or its actuators can be estimated by analyzing the values of the estimated external wrench $\hat{w}_{ext}$. For example, in a VTOL-aircraft, if $\tau_{ext,x}$ is close to zero and $\tau_{ext,y}$ is a negative great value, there is a likelihood of a frontal actuator failure. If $\tau_{ext,x}$ is a positive great value and $\tau_{ext,y}$ is close to zero, there is a likelihood of a right actuator failure. If $\tau_{ext,x}$ is close to zero and $\tau_{ext,y}$ is a positive great value, there is a likelihood of a rear actuator failure. If $\tau_{ext,x}$ is a negative great value and $\tau_{ext,y}$ is a positive great value, there is a likelihood of a left actuator failure.

The estimated external wrench can be generated by a primary control of the VTOL-aircraft. The primary control comprises system components that allow receiving signal inputs from sensors or from a pilot, applying software and algorithm routines and deriving signals in terms of a primary data set for controlling and/or monitoring the condition of the aircraft. The estimated external wrench can be considered a primary data set that is therefore generated by primary control according to the external disturbance estimation described above.

The estimated external wrench allows to perform the assessment of the condition of the aircraft and a localization of potentially unhealthy or defective actuators. The reliability of the determination of the state of the VTOL-aircraft and defective actuators, however, is characterized by a first uncertainty.

In accordance with the present invention, the VTOL-aircraft has a plurality of controls. In particular embodiments, primary control and secondary control can be arranged at the same or different levels of a VTOL-aircraft control architecture. In case of a common level, primary control and secondary control can have identical tasks and accordingly identical embodiments in order to provide redundant system components for the VTOL-aircraft. In case of different levels, the primary control can be superordinate to the secondary control. In this case, primary control can, for example, receive input signals from a pilot and process these into signals, which are transmitted to the secondary control, e.g. to convert a desired movement of the aircraft into a corresponding thrust or torque of the actuators. Therefore, primary control may be configured to monitor and to control a flight state of the VTOL-aircraft, while secondary control is configured to control the actuators, especially the propulsion units. Like the primary control, the secondary control may be connected to a set of sensors, which is capable of monitoring the state of actuators.

In order to achieve a higher reliability of the observed condition of the VTOL-aircraft and/or its actuators additional, secondary control of the VTOL-aircraft can be used to confirm, reject and/or correct the determined state of the VTOL-aircraft. Secondary control is typically used in the control architecture of VTOL-aircrafts to operate actuators of other systems.

In an embodiment of the method according to the invention, the primary control operates as a flight control computer (flight controller), and the secondary control operates as an engine controller.

During operation of the secondary control, the control input u may be received by the secondary control. For example, the i-th control input can be a defined spinning velocity $u_i=1000$ RPM or another type of input depending on the type of actuator and control method. In order to operate the actuator according to the defined input, the operating state of the actuator needs to be measured and/or estimated. The resulting estimated/measured values can be represented in a vector $u' \in \mathbb{R}^r$. If u comprises desired spinning velocities of a number of electric motors in units of revolutions per minute (RPM), then u' comprises the current spinning velocities of the electric motors in RPMs. The measured/estimated values, however, differ from the control input, the difference being characterized by an error $e_u$ with $$e_u = u - u'.$$

Similar to the estimated external wrench $\hat{w}_{ext}$, the error $e_u$ can be used to derive a secondary data set, comprising information about the condition of the VTOL-aircraft and/or its actuators. If an error limit is defined that shall not be exceeded and/or surpassed, an exceeding value of $e_{u,i}$ may be an indicator for a failure state of a condition of the VTOL-aircraft.

In analogy to the primary data set, the secondary data set is therefore affected by a second uncertainty that may result from measurement and/or estimation inaccuracies.

Regarding the information that can be provided by the primary control and the secondary control, the condition of the VTOL-aircraft can be derived using the primary data set, which may be derived from $\hat{w}_{ext}$, and a secondary data set, which may be derived from $e_u$. However, primary control and secondary control may have different properties that may lead to different reliabilities in view of primary and secondary data set.

Different uncertainties of the primary control and the secondary control may result from different measurement frequencies, at which the primary control and the secondary control are operated. In general, all uncertainties may comprise a systematic part of the total uncertainty and a stochastic part of the total uncertainty. This classification and relevant sources for uncertainties are known by the person skilled in the art of measurement systems or control systems engineering.

In order to provide a reliable estimation of the condition of the state of the VTOL-aircraft, it is essential to the invention to use an estimation algorithm that processes the primary data set and the secondary data set in order to generate an estimation result, which estimation result is representative of a condition of the VTOL-aircraft, preferably a health status of at least one actuator of the VTOL-aircraft. Said estimation result is subject to a third uncertainty, which third uncertainty is equal to or lower than the first uncertainty and/or the second uncertainty.

The estimation algorithm may comprise different methods that allow the reduction of uncertainty in both the primary data set and the secondary data set. Statistical methods can be implemented as a part of the estimation algorithm that analyze both primary data and secondary data for outliers that lead to a higher degree of uncertainty of said data sets. Where such outliers exist, they may be removed from the data sets.

If the primary data and the secondary data are subsequently used to determine, e.g., an average value, the result may be considered an estimation result with a lower uncertainty than the primary data or the secondary data. It is also within the scope of the invention to filter the primary data set and/or the secondary data set, respectively. Similarly, confidence intervals may be established by pre-flight checks, outside of which measured or estimated values are discarded from determining a condition of the VTOL-aircraft.

In another embodiment of the method according to the invention, the primary data set and the secondary data set, respectively, represent an identical type of information in a first estimated condition and a second estimated condition of the VTOL-aircraft, more particularly a first estimated health status and a second estimated health status, respectively, of at least one actuator of the VTOL-aircraft.

The estimated external wrench $\hat{w}_{ext}$ and the error $e_u$ comprise different types of information. While the estimated external wrench allows the assessment of external forces, the error only provides information about the difference between a nominal state of an actuator and its actual state. In order to derive an information about the condition of the VTOL-aircraft or the health status of an actuator, both the external wrench and the error need to be pre-processed before they can be interpreted by the estimation algorithm.

Pre-processing, however, may include complex steps such as referencing or calibration to align measured values with a defined scale, in order to determine a condition. Therefore, pre-processing may be time-consuming, leading to an increased complexity of the estimation algorithm.

To address this problem, the primary data set and the secondary data set may be matched before they are entered into the estimation algorithm. The alignment of primary data and secondary data takes place within the primary control and the secondary control, respectively.

The pre-processing leads to the same type of information being comprised in the primary and the secondary data, so that it can be processed directly by the estimation algorithm. For example, the primary data set and the secondary data set may each be represented by a vector that comprises a number of entries which number is equal to the number of actuators, and the health status of an actuator is represented by a numeric value. A high value may represent a healthy actuator, while a low value may represent an unhealthy actuator.

In another embodiment of the method according to the invention, the primary control generates the primary data set at least partially by estimating a first external wrench in a stationary state of the VTOL-aircraft and partially by estimating a second external wrench in a non-stationary state of the VTOL-aircraft, said non-stationary state preferably being caused by the action of at least one actuator which leads to a deviation from said stationary state, the first external wrench and the second external wrench each comprising a first total thrust and a second total thrust and a first torque vector and a second torque vector, respectively.

As mentioned above, the external wrench may have the following form $$\hat{w}_{ext}, \hat{w}_p = [f_{ext,z}\tau_{ext,x}\tau_{ext,y}\tau_{ext,z}]^T \in \mathbb{R}^4.$$

When considering different planned operations of a VTOL-aircraft, such as hovering, climbing, descending, forward and level flight, turning or any other action that is known prior to the flight, stationary states can be computed. A stationary state therefore may be considered a state of the VTOL-aircraft, where no failures occur. The first external wrench in the stationary state shall be called $\overline{w}_p^{opt}$, where right superscript opt stands for operations. These values are acquired from simulations and/or real flight data (experiments, tests, demonstrations) and they represent $\hat{w}_p$ during a steady state (wherein no failure occurs) of that specific operation.

In another scenario, simulation and (if available) flight test data from said planned operations are considered in connection with failure states of the VTOL-aircraft and/or its actuators. For each operation and each failure case, $\hat{w}_p$ is again observed and noted as the second external wrench $\overline{w}_p^{opt,af}$, wherein af stands for actuator failure.

Finally, the difference between $\overline{w}_p^{opt}$ and $w_p^{opt,af}$ can be calculated as reference vectors each including entries of $[f_{ext,z}\tau_{ext,x}\tau_{ext,y}\tau_{ext,z}]^T$ that can be stored in a database or other data storage of the VTOL-aircraft. In a real flight scenario, these vectors can be compared to an actual estimated external wrench in order to classify a current situation, being able to determine if a planned operation is performed as planned or with a specific error. The advantage of this particular embodiment is a simple way to determine if a failure condition has occurred, which is based on empirical and/or offline data from simulations.

In another embodiment of the method according to the invention, the primary control generates the primary data set at least partially by comparison of the first external wrench with the second external wrench, resulting in a first actuator condition vector, which first actuator condition vector comprises values representative of a condition of a respective actuator of the VTOL-aircraft.

According to this embodiment, the estimated wrench in a steady state and the estimated wrench in a failure state can be compared to each other by subtraction, resulting in a differential wrench $\Delta\overline{w}_p^{opt}$ according to the following equation:

$$\Delta\overline{w}_p^{opt} = \overline{w}_p^{opt} - \overline{w}_p^{opt,af}.$$

The differential wrench $\Delta\overline{w}_p^{opt}$ is a vector with entries $[\Delta f_{ext,z}^{opt}, \Delta\tau_{ext,x}^{opt}, \Delta\tau_{ext,y}^{opt}, \Delta\tau_{ext,z}^{opt}]$ in case a thrust is caused by actuators oriented in vertical z-direction or having only a small tilt angle with respect to the vertical z-direction. A loss or failure of an actuator can easily be found using $\Delta f_{ext,z}^{opt}$ by comparing $f_{ext,z}$ to $\Delta f_{ext,z}^{opt}$ with preselected error margin of $\epsilon_{fz}$. With an increased number of actuators, in a failure state $\Delta f_{ext,z}^{opt}$ appears to converge with an allowed limit that shall not be exceeded. Based on a sole interpretation of $\Delta f_{ext,z}^{opt}$ within $\Delta\overline{w}_p^{opt}$, it can at least be determined if all actuators (including propulsion units) are operated in a stationary state or not.

However, in known VTOL-aircraft designs, actuators such as propulsion units can be distributed within the VTOL-aircraft. Especially multicopters comprise propulsion units that are arranged, e.g., in concentric circles and in a common plane/level, for example in an inner circle and an outer circle, respectively. In this case, by observing $\Delta\tau_{ext,z}^{opt}$, it can be determined if the rotational direction of an actuator has changed and/or if it is located in the inner ring or the outer ring.

Then, by observing $\Delta\tau_{ext,x}^{opt}$ and $\Delta\tau_{ext,y}^{opt}$, the position of a possibly failed actuator can be narrowed down further, e.g., whether it is located on the left or right, rear or front. If $\tau_{ext,x}$ is close to zero and $\tau_{ext,y}$ is a negative great value, the likelihood of a frontal actuator failure increases. If $\tau_{ext,x}$ is a positive great value and $T_{ext,y}$ is close to zero, the likelihood of a right actuator failure increases. If $\tau_{ext,x}$ is close to zero and $\tau_{ext,y}$ is a positive great value, the likelihood of a rear actuator failure increases. If $\tau_{ext,x}$ is a negative great value and $\tau_{ext,y}$ is a positive great value, the likelihood of a left actuator failure increases.

The estimation of the position of a failed actuator can be implemented within the estimation algorithm. This may include the definition of a search space, comprising all actuators that may potentially fail. Each actuator in said search space has a known position within the VTOL-aircraft and a health status that may be represented by a numeric value. This information can be assigned to a vector $m^F \in \mathbb{R}^t$, which is considered a first actuator condition vector.

According to another embodiment of the method according to the invention, the primary data set is generated at least partially by a motor allocation algorithm, which motor allocation algorithm is configured to determine a nominal thrust distribution provided by the propulsion units in order to achieve and/or maintain a desired state of the VTOL-aircraft.

The motor allocation algorithm generates a control signal for the operation of the propulsion units, based on a desired thrust and/or torque that is defined by a pilot or an autonomous navigation system of the VTOL-aircraft.

The allocation algorithm can be employed to calculate the relationship between the pseudo-control input and the control input, as defined above. Therefore, data that is already used for the operation of the VTOL-aircraft can both be used for the control of the system and for monitoring purposes of the actuators themselves.

For example, a differential control input $\Delta u$ can be computed using the following equation:

$$\Delta u = D^{-1}\Delta\overline{\omega}_p^{opt}.$$

In an aircraft with 18 actuators, the differential control input has 18 entries $$\Delta u=[\Delta u_1, \ldots, \Delta u_i, \ldots, \Delta u_{18}]T \in \mathbb{R}^{18}.$$

The smaller $\Delta u_i$, the lower the health status of i-th actuator. These values are assigned in $m^F \in \mathbb{R}^t$, which may represent the first actuator condition vector.

In another embodiment of the method according to the invention, the secondary data set is generated at least partially by sensor means used for measuring an operating speed and/or a temperature of at least one of the actuators, and a second actuator condition vector is derived from the secondary data set, which second actuator condition vector comprises values representative of a condition of a respective actuator of the VTOL-aircraft.

As mentioned above, the secondary control may determine a difference between a set of nominal values u and another set of actual values u' that are measured by sensors and are communicated to said secondary control. According to the determined difference, an error $e_u$ according to $$e_u = u - u'$$

can be assigned. A root-mean-square $E_{rms}$ of the error $e_u$ over a specific amount of time (or for specific computation cycles) can be calculated using $$E_{rms} = \sum_{k=0}^{N} e_{u,k} e_{u,k}^T \in \mathbb{R} t \times t$$

k represents discrete time steps and N stands for an upper limit of the computation cycles used to compute the root-mean-square $E_{rms}$. $E_{rms}$ is a t×t diagonal matrix and can be compared to an absolute error value that shall not be exceeded. The computation can be implemented in a moving window manner, i.e., after, e.g., $\Delta k$ steps, $$E_{rms} = \sum_{k=\Delta k}^{N+\Delta k} e_{u,k} e_{u,k}^T$$

is computed, and so on. A vector $\bar{e} \in \mathbb{R}^t$ can be defined, which comprises the allowable maximum tracking errors for each actuator. This implies for the i-th actuator that said actuator is considered completely unhealthy, maybe even lost, if $E_{rms}(i, i)$ is greater than $\bar{e}_i$.

Furthermore, an additional measurement or estimation of a parameter, e.g., temperature, vibration, torques, currents, voltage or another parameters/variables, can be included for determining a condition of the VTOL-aircraft and/or its actuators. $\gamma \in \mathbb{R}^t$ represents said additional parameter, with at least two limits $\gamma^a < \gamma^b \in \mathbb{R}^t$, where $\gamma^a$ is a first limit threshold and $\gamma^b$ is a second limit threshold. If, e.g., for i-th actuator $\gamma_i > \gamma_i^a$, then the actuator has decreasing condition properties (current condition or health status can be multiplied with $\alpha_i \in [0, 1]$), and if $\gamma_i > \gamma_i^b$ then the i-th actuator is in danger (current condition or health status is multiplied with $\beta_i \in [0, 1]$ and $\beta_i < \alpha_i$). $\gamma \in \mathbb{R}^t$ can be, without limitation, a parameter relating to the actuator temperature, actuator vibration or other determinable actuator property, that can be assessed to determine the health status of an actuator.

In this case, $x^E = [u'^T \gamma^T]^T$ represents the actual states of the secondary control that are considered for judging the health status of the actuators. As mentioned above, more states and parameters can be included in $x^E$, e.g., by using actuator torques, currents, vibration measurements/analysis, etc.

The algorithm for determining an actuator health status observation/estimation from the secondary control has an output $m^E \in \mathbb{R}^t$, which is considered as a second actuator condition vector.

In another embodiment of the method according to the invention, the estimation result is a position of at least one abnormally operating and/or defective actuator, preferably one of the propulsion units, within the VTOL-aircraft, for instance a position of said actuator relative to a center of the aircraft.

The information provided by the primary control and the secondary control preferably comprise a directly interpretable statement about the state of the aircraft where a critical condition occurs. In a corresponding embodiment of the method according to the invention, safety critical information may be interpreted both by skilled pilots and unskilled passengers, especially during application of the method within an autonomously guided VTOL-aircraft. In addition, after landing due to a defective actuator, maintenance is accelerated if a position of the defective actuator is known. The position can be described in any reference coordinate system of the VTOL-aircraft. Preferably, the origin of the coordinate system in which the position is indicated is located in the Center of Gravity of the aircraft. Alternatively, the position can be indicated by an individual designation or identification number of an actuator.

In another embodiment of the method according to the invention, the estimation algorithm is an optimum estimation algorithm, preferably a Kalman filter, comprising at least one prediction step and at least one update step.

By implementing the prediction and update step, the estimation algorithm is allowed to correct previously estimated value in order to provide an estimation that is based on most actual data. Algorithms based on Kalman filters have the advantage that they are also based on performing a prediction and update step. For this reason, the estimation algorithm can be based on the equations below, which are common for state estimation using Kalman filters.

For the implementation of a Kalman filter based estimation algorithm, the health status of the VTOL-aircraft actuators are assumed to have discrete time linear system dynamic behavior according to $$s_k = F_k s_{k-1} + G_k(v_k + \nu_k),$$

where $s_k \in \mathbb{R}^n$ is the state vector at time step k, $F_k \in \mathbb{R}^{n \times n}$ is the state transformation matrix, $v_k \in \mathbb{R}^m$ is a known control input vector at time step k, $G_k \in \mathbb{R}^{n \times m}$ is the control input matrix, and $\nu_k \in \mathbb{R}^m$ is a zero-mean white Gaussian process noise, such that $\nu_k \sim N(0, Q_k)$, with model covariance $Q_k$ given by $$Q_k = E[\nu_k \nu_k^T],$$

where E is the expected value of the known input vector. An observation matrix $H_k$ maps the state $s_k$ to a measurement $z_k$. Then, a general measurement equation can be written as $$z_k = H_k s_k + \mu_k,$$

where $\mu_k$ collects the zero-mean measurement noises, where $\mu_k \sim N(0, R_k)$, with sensor covariance $R_k$ given by $$R_k = E[\mu_k \mu_k^T]$$

In the prediction step, the system dynamic model is used in order to provide an a priori estimate of the state at time step k, depicted by $\hat{s}_k^-$ as $$\hat{s}_k^- = F_k \hat{s}_{k-1} + G_k v_k,$$

where superscript *⁻ stands for an a priori value that is computed in the prediction state. The a priori covariance is computed as $$\hat{P}_k^- = F_k P_k F_k^T + Q_k G_k Q_k^T.$$

If the initial state $\hat{s}_k$ for k=0 is known, P equals 0. With increasing uncertainty in the initial state, one can choose P=λI, where λ∈[0,1] and I is an identity matrix (its diagonal consists of ones and all other elements are zero) in proper dimensions.

In another embodiment of the method according to the invention, by means of the prediction step, a current condition of the VTOL-aircraft, preferably a health status of at least one actuator of the VTOL-aircraft, is estimated using a physical model of the VTOL-aircraft and a first sensor data set obtained by means of at least one first sensor, and in which, by means of the update step, the estimated current condition of the VTOL-aircraft, preferably a health status of at least one actuator of the VTOL-aircraft, is adapted using a second sensor data set obtained by means of at least one second sensor.

With every prediction step, the covariance $\hat{P}_k^-$ inherently grows, which increases an uncertainty of the estimate. This estimate is to be updated with measurement $z_k$ in the update step. The following residual (error) between the measurement and the estimated value of it from the prediction step can be computed by:

$$y_k = z_k - H_k s_k^-.$$

The covariance of the residual can be computed as $$S_k = H_k \hat{P}_k^- H_k^T + R_k.$$

A Kalman filter gain can be computed via $$K_k = \hat{P}_k^- H_k^T S_k^{-1}.$$

Based on this, a posteriori state estimate and the covariance of this estimate can be computed as $$\hat{s}_k = \hat{s}_k^- + K_k y_k,$$

$$\hat{P}_k = (I - K_k H_k) \hat{P}_k^-,$$

where I is an identity matrix (its diagonal consists of ones and all other elements are zero) with proper dimension.

The primary data set can be processed by the prediction step, and the secondary data set is processed by the update step, or vice versa, or both primary and secondary data sets can be processed by the update step.

In this embodiment of the method according to the invention, the prediction is done based on $m^F$, i.e., $m_k^F = v_k$. The state is $s_k = m_k$. Hence, $$m_k = F_k m_{k-1} + G(m_k^F + v_k),$$

with $F_k = G_k = I \in \mathbb{R}^{k \times k}$. The update/correction is done with $m^E$, i.e., $z_k = m_k^E$, $H_k = I$.

According to a second option of this embodiment of the method according to the invention, the prediction is done based on $m^E$, i.e. ($m_k^E = v_k$). The state is $s_k = m_k$. Hence, $$m_k = F_k m_{k-1} + G_k(m_k^E + v_k),$$

with $F_k = G_k = I \in \mathbb{R}^{k \times k}$. The update/correction is done with $m^F$, i.e. $z_k = m_k^F$, $H_k = I$.

In another embodiment of the method according to the invention, the predictive step is carried out using a linear system model of the VTOL-aircraft condition or actuator health status and an assumed initial condition of the VTOL-aircraft condition or actuator health status, and in which both the primary data set and the secondary data set are entered into the update step.

In this embodiment of the method according to the invention, the prediction is done with linear system dynamics, using constant or slowly decaying properties. The state is $s_k = m_k$. Hence, $$m_k = F_k m_{k-1}$$

with $G_k = 0 \in \mathbb{R}^{k \times k}$, 0 is a matrix with its all elements equal to zero and of proper dimension. $F_k = \mathrm{diag}\{f_k^1, \ldots, f_k^t\}$, where $0 \ll f_k^i \leq 1$. The update/correction is done twice, with $m^F$ and $m^E$, i.e., $z_k^1 = m_k^F$ and $z_k^2 = m_k^E$. Moreover, $H_k^1 = H_k^2 = I$. The order of the updates does not matter.

In another embodiment of the method according to the invention, the estimation algorithm determines a moving average estimation from the primary data set and from the secondary data set, respectively, the primary data set and the secondary data set being weighted complementarily to one another according to a heuristically assumed reliability of the primary data set and the secondary data set, respectively.

It is possible to implement a variant of the method that is not based on Kalman filters by using an exponentially weighted moving average for combining two estimation sources:

$$m' = \Lambda m^F + (I - \Lambda) m^E,$$

where I is an identity matrix in proper dimensions, $\Lambda = \mathrm{diag}\{\lambda_1, \ldots, \lambda_t\} \in \mathbb{R}^{t \times t}$ and $\lambda_i \in [0, 1]$. Note that if $\lambda_i = 0$, the health status observation relies only on secondary control, and if $\lambda_i = 1$ it relies only on primary control, for the i-th actuator. Any value between 0 and 1 implies a combination of both. This value is closer to 0 if secondary control data is more reliable, and closer to 1 if primary control data is more reliable. The reliability can be assigned based on heuristics collected via simulations and (flight) tests.

BRIEF DESCRIPTION OF THE DRAWINGS

Further details and advantages of the invention will now be explained in exemplary fashion based on the appended drawings.

DETAILED DESCRIPTION

Figure 1:
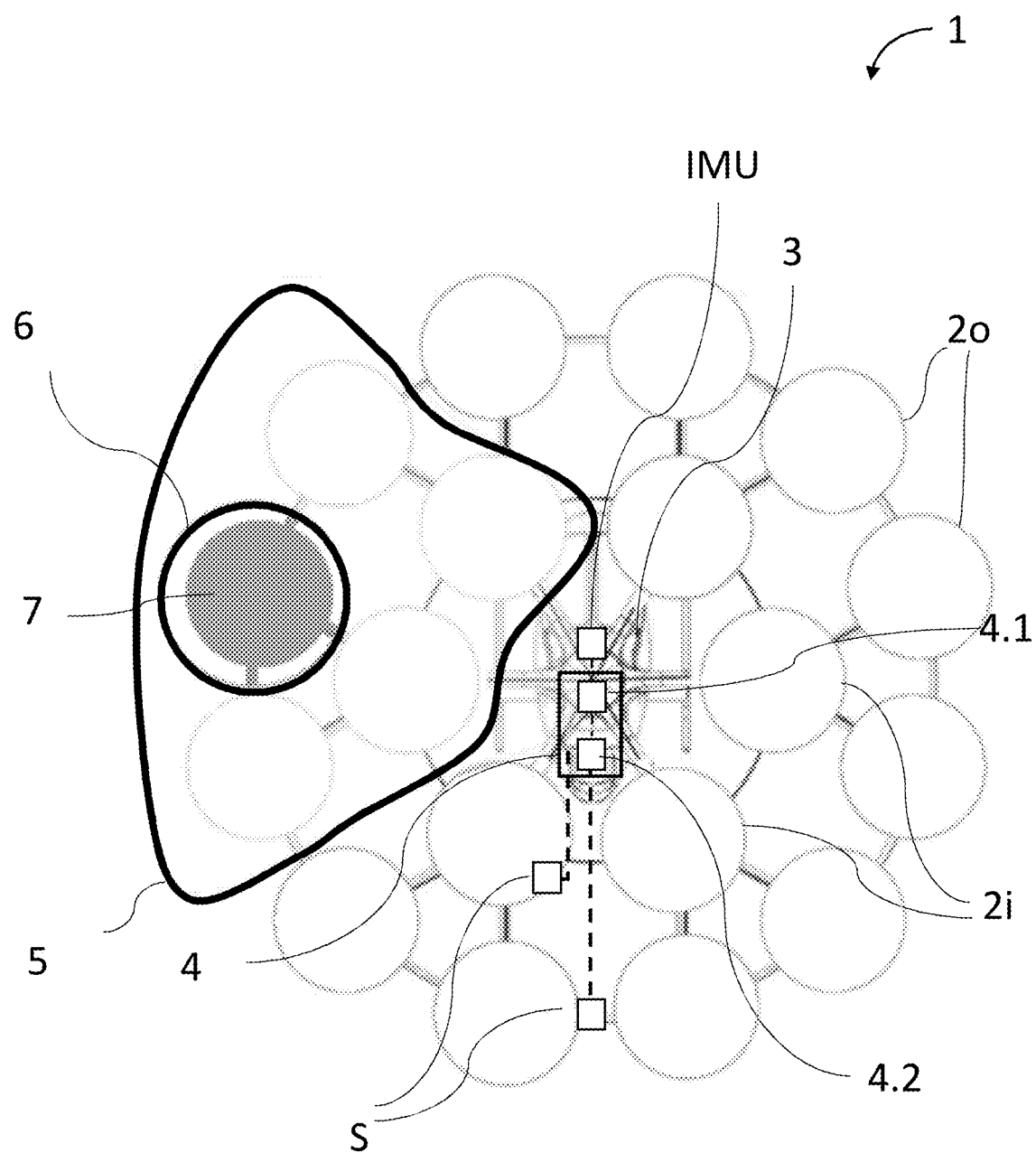
FIG. 1 shows a VTOL-aircraft with an unhealthy propulsion unit in a position, which is estimated using a primary data set and a secondary data set.

FIG. 1 shows a VTOL-aircraft 1 with propulsion units 2o arranged in an outer circle, and propulsion units 2i arranged in an inner circle above a body 3 (or central pod/cabin) of VTOL-aircraft 1. VTOL-aircraft 1 comprises a control system 4, which control system 4 comprises a primary control configured as flight control system (FCS) 4.1 and a secondary control configured as electric propulsion system (EPS) 4.2. In general, EPS 4.2 does not have to be unique: there can be more than one EPS, e.g., one per motor/rotor. FCS 4.1 is used as main control system in order to operate the VTOL-aircraft 1 and control its position during flight. EPS 4.2 is used to control propulsion units 2i and 2o according to the control signals that are generated by a pilot or a navigation routine of FCS 4.1. Furthermore, FCS 4.1 is connected to an inertia measurement unit IMU, providing acceleration and rotational velocity data of the VTOL-aircraft 1. EPS is connected to a set of sensors S that provide information about operating characteristics of propulsion units 2i, 2o such as temperature or vibration. Control system 4 is configured to operate a Kalman filter based algorithm (see FIGS. 7 to 9), in order to estimate a health status of the propulsion units 2i, 2o and a position of a potentially unhealthy propulsion unit within VTOL-aircraft 1, based on data that is generated by EPS 4.2 and FCS 4.1.

FCS 4.1 generates a first data set, which first data set allows a first estimation 5 of a location of one or more unhealthy propulsion units. To generate said first data set, sensor measurements from IMU (and if available from other sensors, too, e.g. barometer, radar, GNSS, etc) is communicated to FCS 4.1. If the measured acceleration or a change of acceleration exceeds or falls below a predefined limit, FCS 4.1 generates estimation 5 by using the method explained above for computing $m^F$, which utilizes heuristically known threshold values for thrusts and torques (threshold values that are used for this example are described in the context of FIGS. 4 to 6). However, only a rough approximation can be made as to where unhealthy propulsion units are located based on said first data set alone. As shown in FIG. 1, based on estimation 5, in total, five propulsion units can be considered unhealthy.

EPS 4.2 provides a second data set, that is used to narrow down estimation 5 in order to determine a position of an actually unhealthy propulsion unit. By measuring, e.g., RPMs and/or temperatures of all propulsion units 2i, 2o using sensors S, a second estimation 6 is derived from the second data set. EPS 4.2 compares measured RPMs and/or temperature values of propulsion units 2i, 2o or the change of a measured RPM and/or temperature value with a predefined threshold value. However, contrary to estimation 5, estimation 6 allows to determine one single propulsion unit that is potentially unhealthy.

The difference between estimate 5 and estimate 6 can have different causes. For example, the sensors S can be operated with higher measurement frequencies than inertia measurement unit IMU, which may result in a lower uncertainty of the data from sensors S. In addition, the measured temperature value of the unhealthy propulsion unit may exceed its corresponding threshold value more significantly than the data from the IMU.

The difference between the numbers of potentially unhealthy actuators between estimation 5 and estimation 6 is expressed by correspondingly different uncertainties. By fusing estimation 5 and estimation 6 in an estimation algorithm that is operated in the control system 4, an estimation result 7 can be generated that allows a combined consideration of estimation 5 and estimation 6. The estimation algorithm is designed as a Kalman filter algorithm, possible forms of which are explained in detail in FIGS. 7 to 9.

In the case according to FIG. 1, estimation 6 was used to narrow down estimation result 5. However, the case shown in FIG. 1 illustrates a relatively simple scenario because estimation result 7 is identical with estimation result 6. However, the determination of unhealthy propulsion units can be more complex, especially if the estimations of FCS 4.1 and EPS 4.2 are different. Such a case, based on the same VTOL-aircraft 1, however with a different unhealthy propulsion unit, is shown in FIG. 2.

Figure 2:
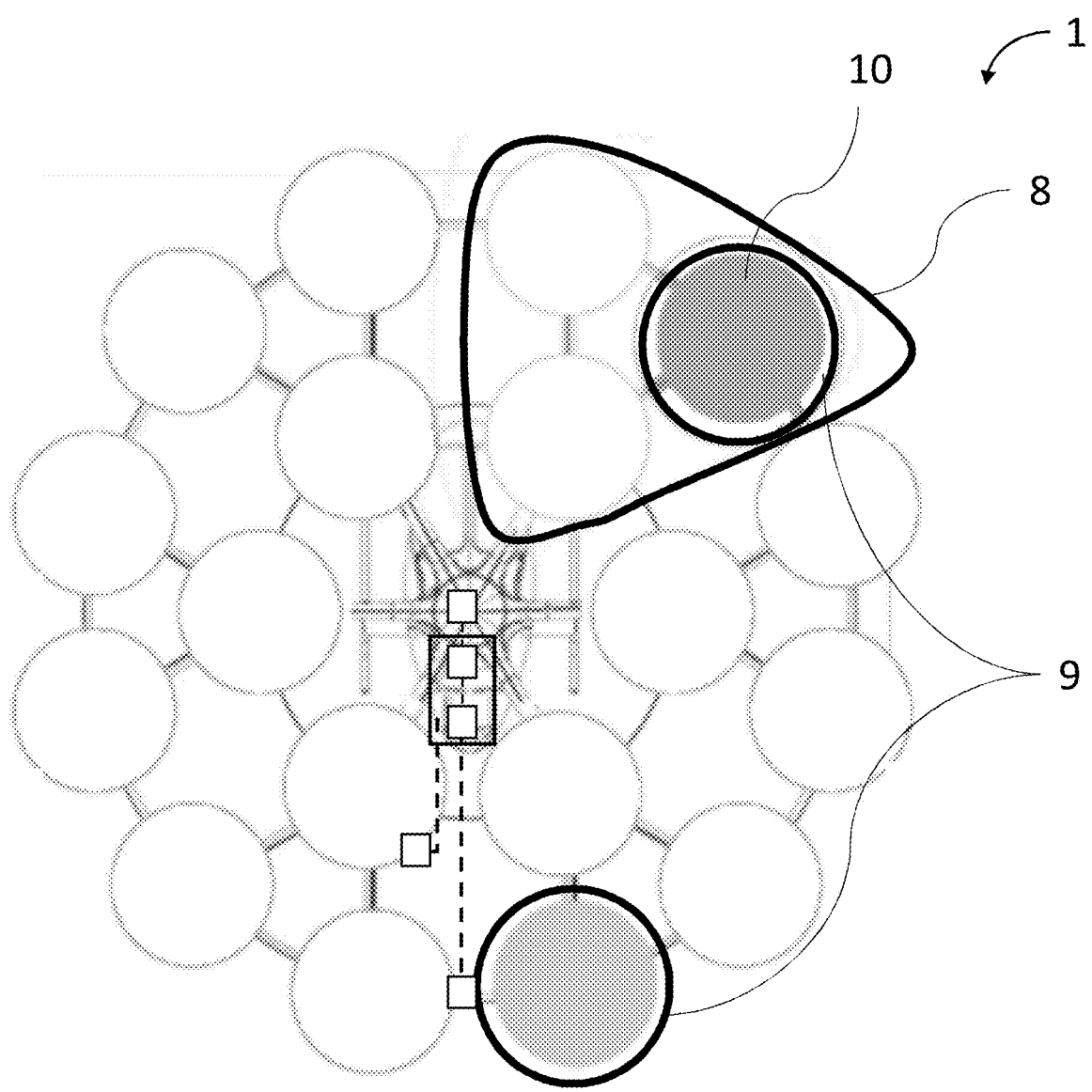
FIG. 2 shows the VTOL-aircraft with another unhealthy propulsion unit in a position, which is estimated using a primary data set and a secondary data set.

FIG. 2 shows VTOL-aircraft 1 with different health status estimations compared to FIG. 1. While estimation 8, which is provided by FCS, indicates that three propulsion units may be unhealthy, which propulsion units are grouped in one area, estimation 9, which is provided by EPS, indicates that there are two possibly unhealthy propulsion units, which are located in different positions.

Separate evaluation of the estimations 8 and 9, respectively, could lead to incorrect identification of allegedly unhealthy propulsion units. For example, if only estimation 8 is considered, an adapted control of all three actuators indicated by estimation 8 would be necessary during flight to achieve a desired flight state, or a false information on actuator status would be indicated to the pilot. Similarly, if only estimate 9 is assessed, it would be necessary to adjust the operation of the two units indicated by estimation 9, or again another false information on actuator status would be indicated to the pilot. However, by using a first data set from FCS and a second data set from EPS analogically to the case depicted in FIG. 1, the location of a critically unhealthy propulsion unit can be narrowed down in an estimation result 10 with an uncertainty that is lower than the uncertainties of both estimations 8 and 9. This is done by using routines that are described below with regard to FIGS. 3 to 9. Said routines are operated in the control system 4 of VTOL-aircraft 1, as shown in FIGS. 1 and 2.

Figure 3:
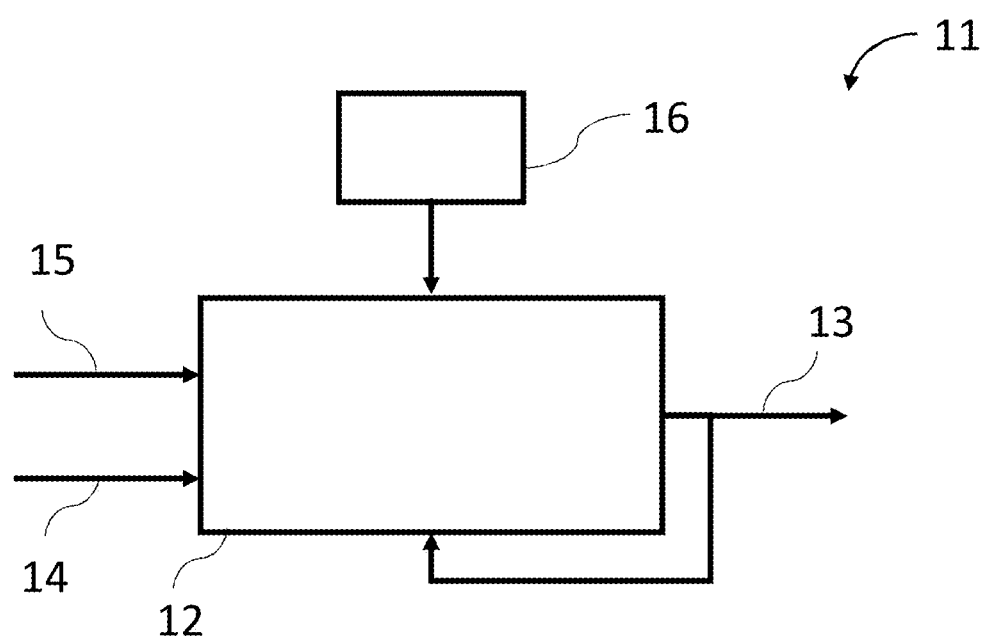
FIG. 3 shows a schematic view of an external disturbance observer.

FIG. 3 shows an external disturbance observer 11 that is implemented in FCS 4.1 of VTOL-aircraft 1 (see FIG. 1), or in another computer, which communicates with FCS 4.1 of VTOL-aircraft 1. In the example shown, disturbance observer 11 comprises an observer routine 12 for estimating an (unknown) external wrench 13 acting on the center of gravity of the VTOL-aircraft. Said external wrench 13 comprises a vector that has numeric values, which allow to determine if a propulsion unit (2i, 2o; see FIG. 1 or 2) is providing improperly deviating thrust and torques in relation to nominal thrust and torques. Estimation takes place by applying, e.g., a momentum-based approach, which receives sensor data 14 and control signals 15. Sensor data 14 comprises measurement values from, e.g., inertial measurement units IMU (see FIG. 1) or images received by a camera of the VTOL-aircraft, or other measurements from radar, lidar, GNSS, etc. Control signals 15 may result from FCS (see FIG. 1) and be generated by a pilot or a navigation routine that is implemented in the control system of the VTOL-aircraft to allow autonomous motion.

By using a physical model 16 of the VTOL-aircraft, sensor data 14 and control signals 15 are processed in order to estimate external wrench 13. In order to reduce an estimation residuum, estimated external wrench 13 is fed back to the observer routine 12. External wrench 13 comprises a thrust force and torques (with respect to roll, pitch and yaw-angles of the VTOL-aircraft) that can be compared to absolute or relative threshold values in order to determine a condition of the VTOL-aircraft and/or its propulsion units.

Estimated wrench 13 can be determined in at least two states: a stationary state with all propulsion units being healthy, and a non-stationary state with at least one propulsion unit being unhealthy or completely defective. Using test flights and simulations, the effect of an unhealthy propulsion unit can be mapped to a change of vertical thrust as well as changes in yaw, pitch and roll torques (with respect to a center of gravity of the VTOL-aircraft). Said change can be stored as an offline-reference data in the aircraft before a flight starts. If an error occurs during flight, which is noticeable in the change of an estimated external wrench, this change can be compared with the offline reference to derive which propulsion unit is potentially affected by the error. These references (or thresholds) are exemplified in FIGS. 4 to 6.

Figure 4:
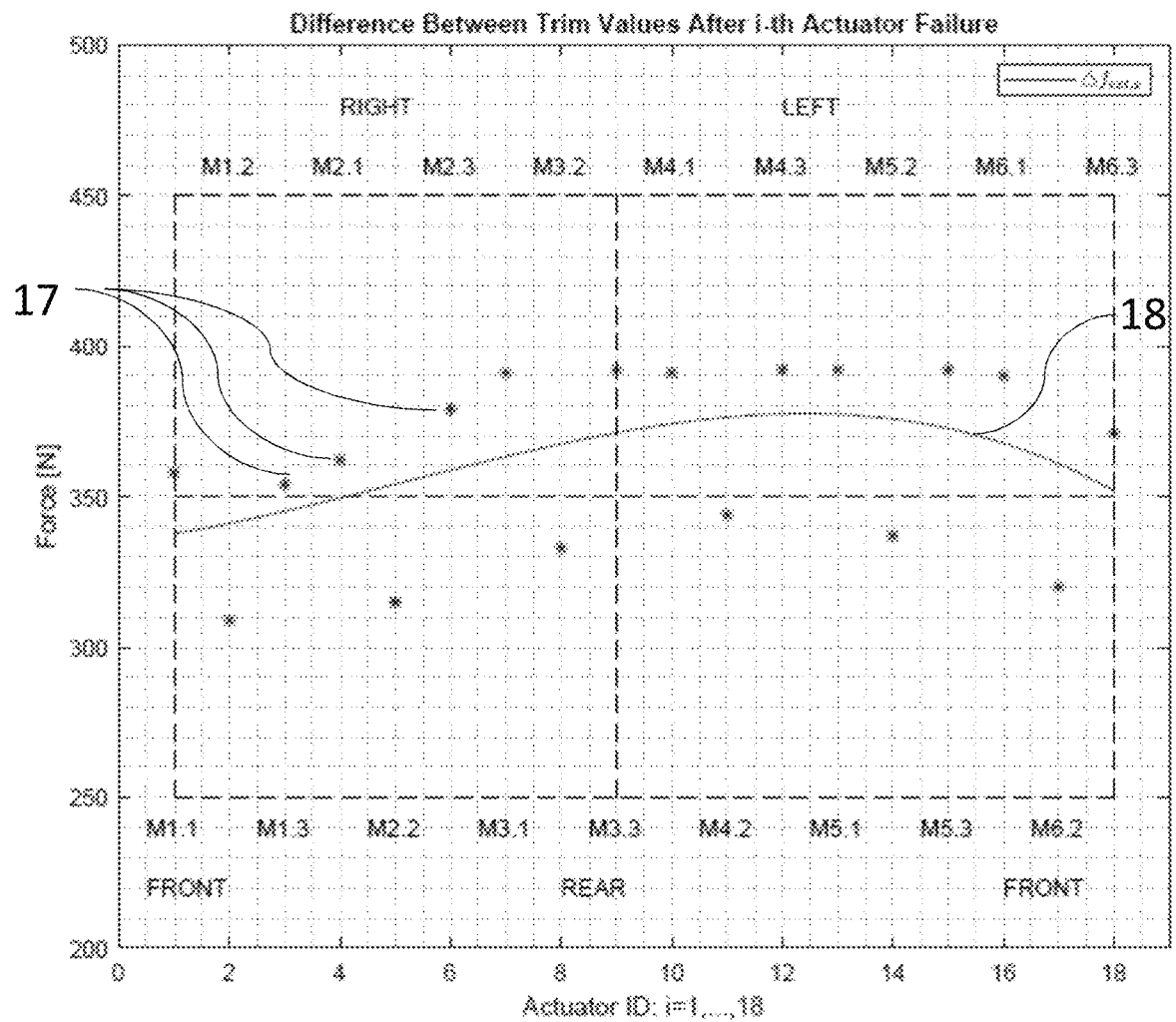
FIG. 4 shows the change of vertical force due to the failure of propulsion units.

FIG. 4 shows a change of vertical forces that are generated by propulsion units 2i, 2o of VTOL-aircraft 1 (see FIG. 1) after a failure of one or more propulsion units, with each propulsion unit being denoted by an actuator-ID 1 . . . 18 and an individual name M1.1 . . . M6.3. If one of the actuators fails during its operation, the vertical thrust of the aircraft changes in a way that can directly be linked to the failed actuator.

First, the VTOL-aircraft is brought into a stationary state during a test flight or simulation. During this stationary state, the external wrench is determined. Then, the actuators of the VTOL-aircraft are successively switched off or brought into another state so that a non-stationary state of the VTOL-aircraft is achieved, and the vertical forces in the non-stationary state are determined. By subtracting the vertical forces of the stationary state from the vertical forces of the non-stationary state, the change of force can be calculated and represented by data points 17, that are shown in FIG. 4. Data points 17 allow an approximation that is represented by a mathematical model 18, which can be used to map a change of vertical force to the actuator-ID of an unhealthy propulsion unit. Said mathematical model 18 is stored in control system 4 (see FIG. 1) of the VTOL-aircraft and used as offline-reference during a real flight scenario: During a flight, the external wrench is determined with an external disturbance observer 11 (see FIG. 3). If an estimated value of the external wrench deviates from the offline-reference with a predefined margin, it can be determined whether a non-stationary state has occurred and which propulsion unit is potentially unhealthy.

Figure 5:
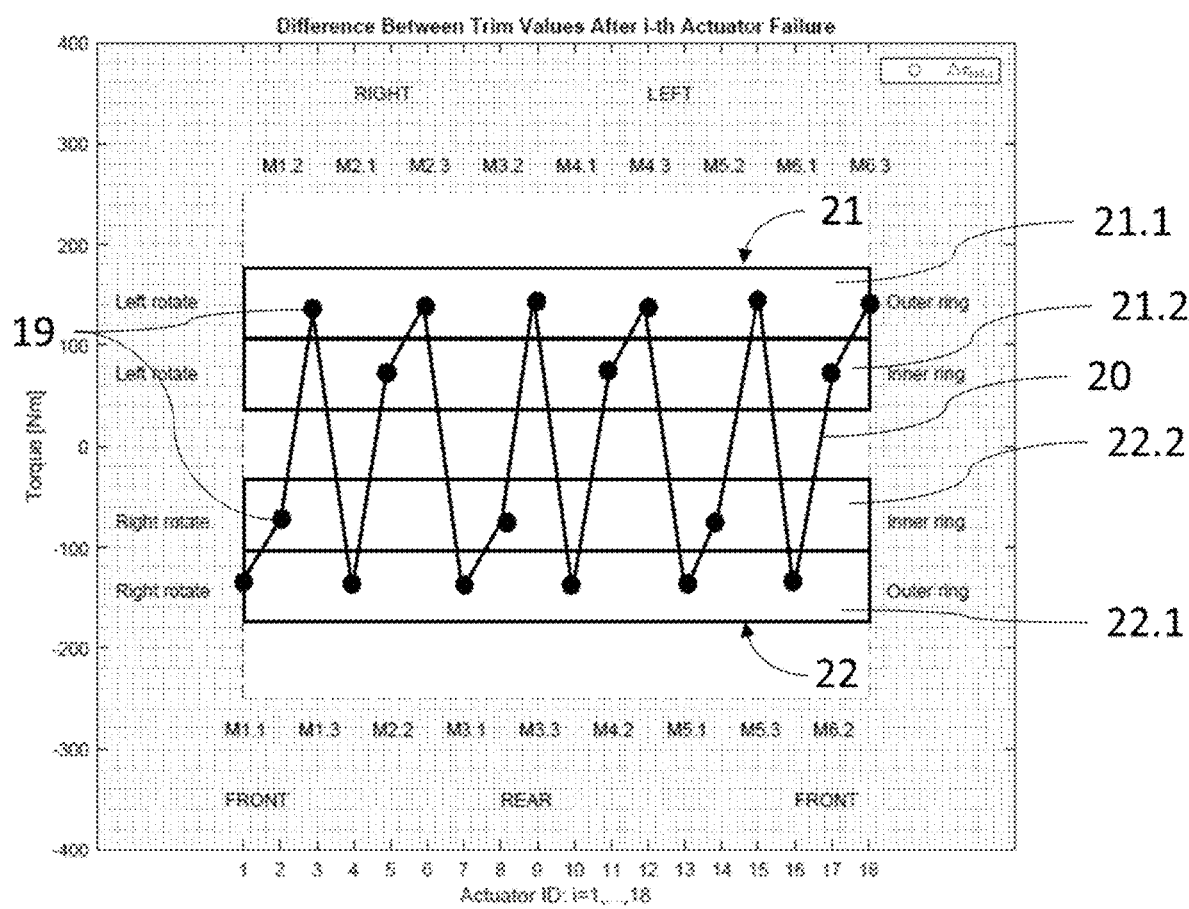
FIG. 5 shows the change of yaw torques due to the failure of propulsion units.

FIG. 5 shows a change of yaw torques (with respect to a yaw axis of the VTOL-aircraft according to FIG. 1) that are generated by propulsion units 2i, 2o (see FIG. 1), in case of a failure of a particular actuator, with each actuator having an actuator-ID 1 . . . 18 and an individual name M1.1 . . . M6.3. Each point 19 represents a measured difference of torque (Newton meters [Nm]). In analogy to FIG. 4, the entirety of data points 19 can be used to derive a mathematical model 20 that approximately represents the change of yaw torque as a function of a failed actuator. Therefore, similarly to model 18, model 20 can be stored in the control system of the VTOL-aircraft and used in-flight as another offline-reference to determine unhealthy propulsion units.

As can be seen in FIG. 5, data points 19 can be divided into two groups 21 and 22, where the data points of group 21 represent a positive change in the yaw torque, while the data points of group 22 represent a negative change in the yaw torque. According to the relative position of a propulsion unit to the center of gravity (CoG) of the VTOL-aircraft, the failure of a propulsion unit that has a greater distance to the CoG has another effect than the failure of a propulsion unit that is closer to the CoG. Therefore, groups 21 and 22 can be subdivided into subgroups 21.1, 21.2 and 22.1, 22.2 respectively. Propulsion units that are located in the outer ring (see propulsion units 2o in FIG. 1) can be linked to groups 21.1 and 22.1. In the shown diagram, their failure can be tracked back to a higher change of yaw torque (see groups 21.1 and 22.1) compared to a failure of propulsion units that are located in the inner ring (see groups 21.2 and 22.2).

Figure 6:
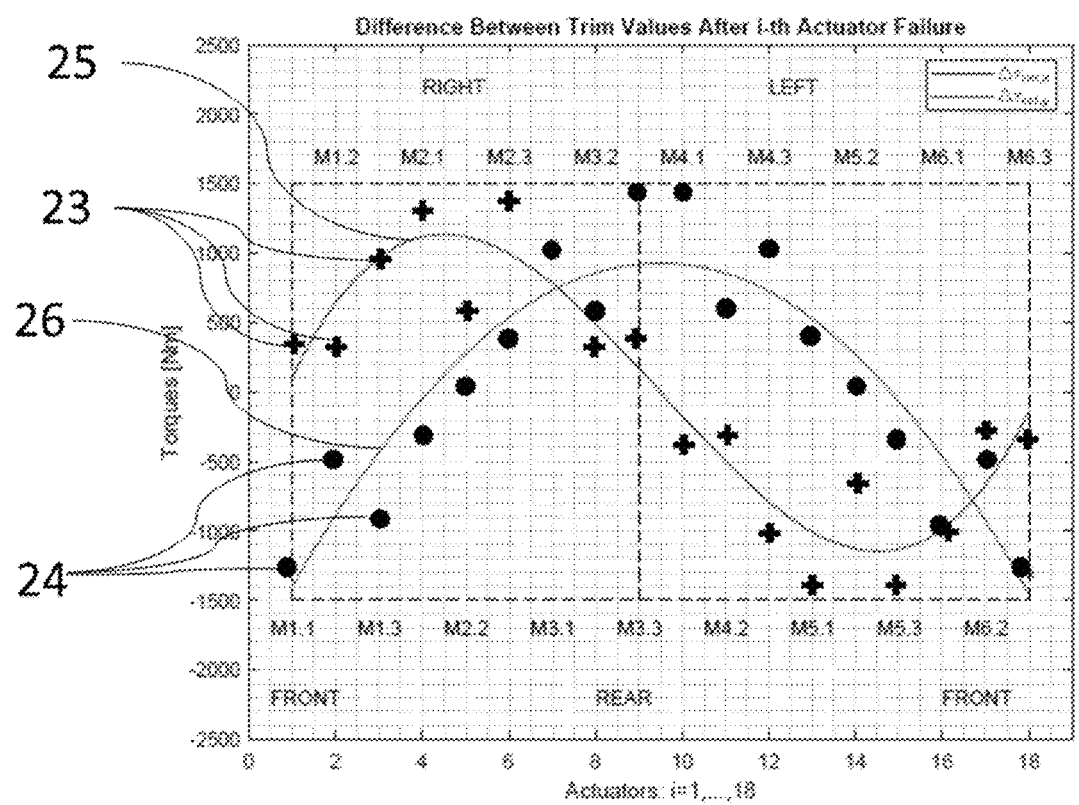
FIG. 6 shows the change of roll and pitch torques due to the failure of propulsion units.

FIG. 6 shows a change of roll torque 23 (crosses) and a change of pitch torque 24 (circles) depending on the failure of a particular actuator, with each actuator having an actuator ID 1 . . . 18 and an individual name M1.1 . . . M6.3. Each point 23 and 24, respectively, represents a measured difference of torque (Newton meters [Nm]). Similarly to FIGS. 4 and 5, the respective entireties of points 23 and 24 allow the derivation of mathematical models 25 and 26 that respectively approximate characteristic changes of roll and pitch torques. In addition to the information that is provided by analyzing the change of vertical force or yaw torque, the mathematical models 25 and 26 allow to estimate whether an unhealthy propulsion unit is located on the right side or on the left side of the VTOL-aircraft 1 as shown in FIG. 1, with respect to its main flight direction (not shown).

The diagrams according to FIGS. 4, 5 and 6 have in common that all measured data, represented by single measurement values 17, 19, 23 and 24, are prone to a natural scattering, due to which the measurement values may vary, when repeating the measurements. Another source of uncertainty results from the mathematical modeling, leading to a residual error between the mathematical models 18, 20, 25 and 26 and their respective data.

Figure 7:
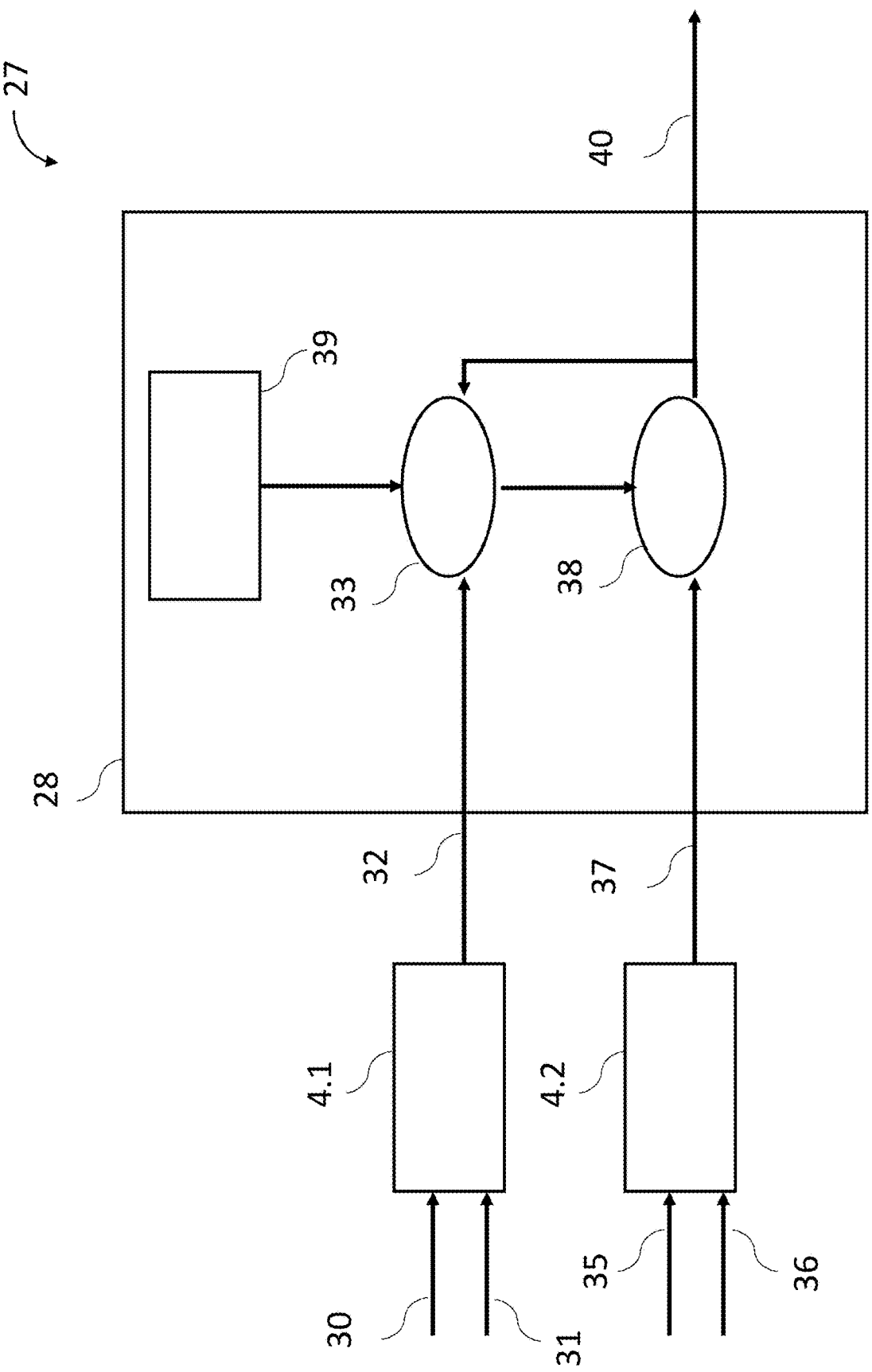
FIG. 7 shows the pre-processing and subroutines of the estimation algorithm, using flight control system data in a prediction step and electric propulsion system data in an update step.

In order to reduce uncertainty, the data shown in FIGS. 4, 5 and 6 can be fused with additional data from a secondary control, e.g., EPS 4.2 according to FIG. 1, by using a Kalman filter algorithm 17 which generally comprises a prediction step and an update step, and which is schematically shown in FIG. 7.

Figure 8:
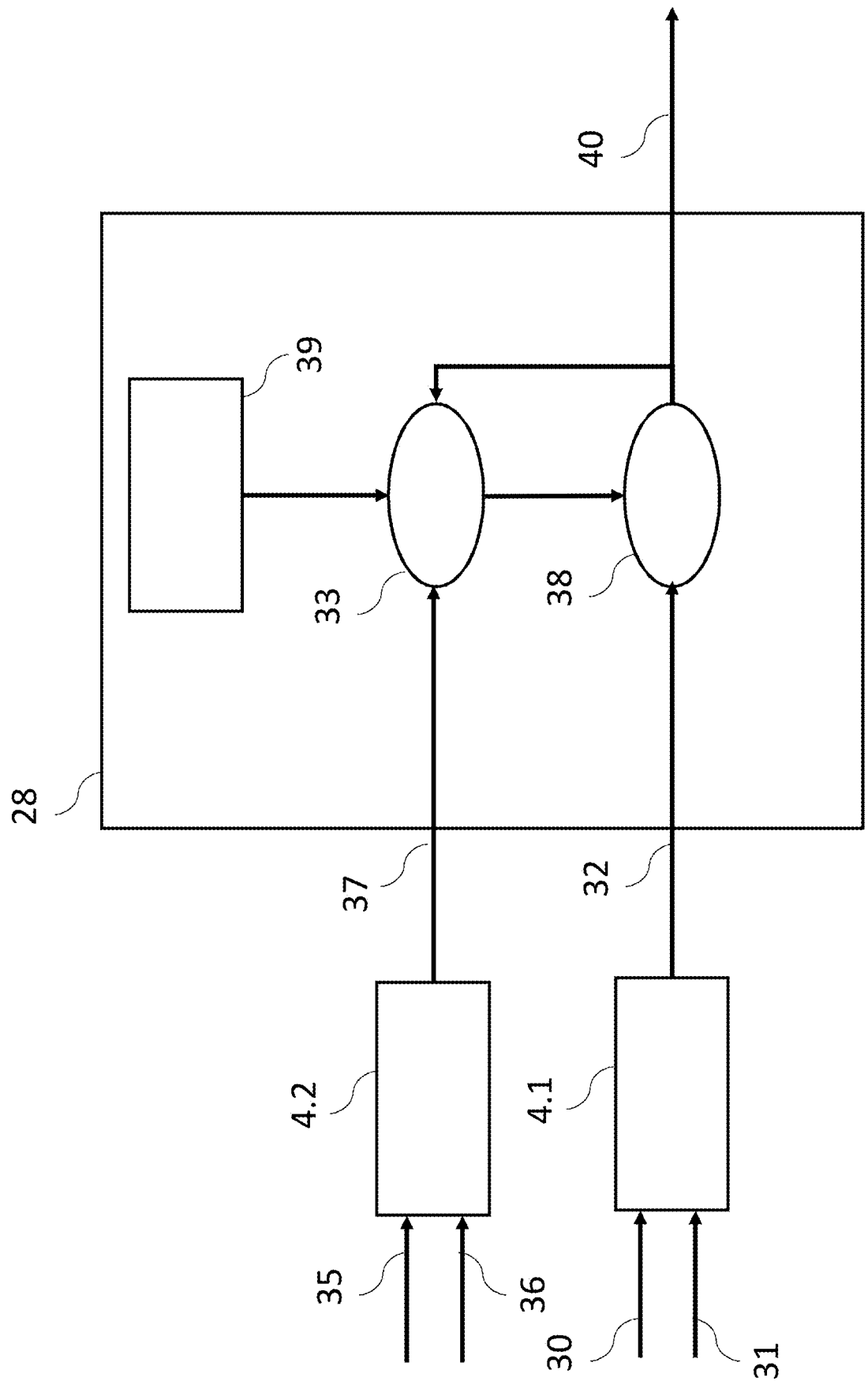
FIG. 8 shows the pre-processing and subroutines of the estimation algorithm, using electric propulsion system data in a prediction step and flight control system data in an update step.
Figure 9:
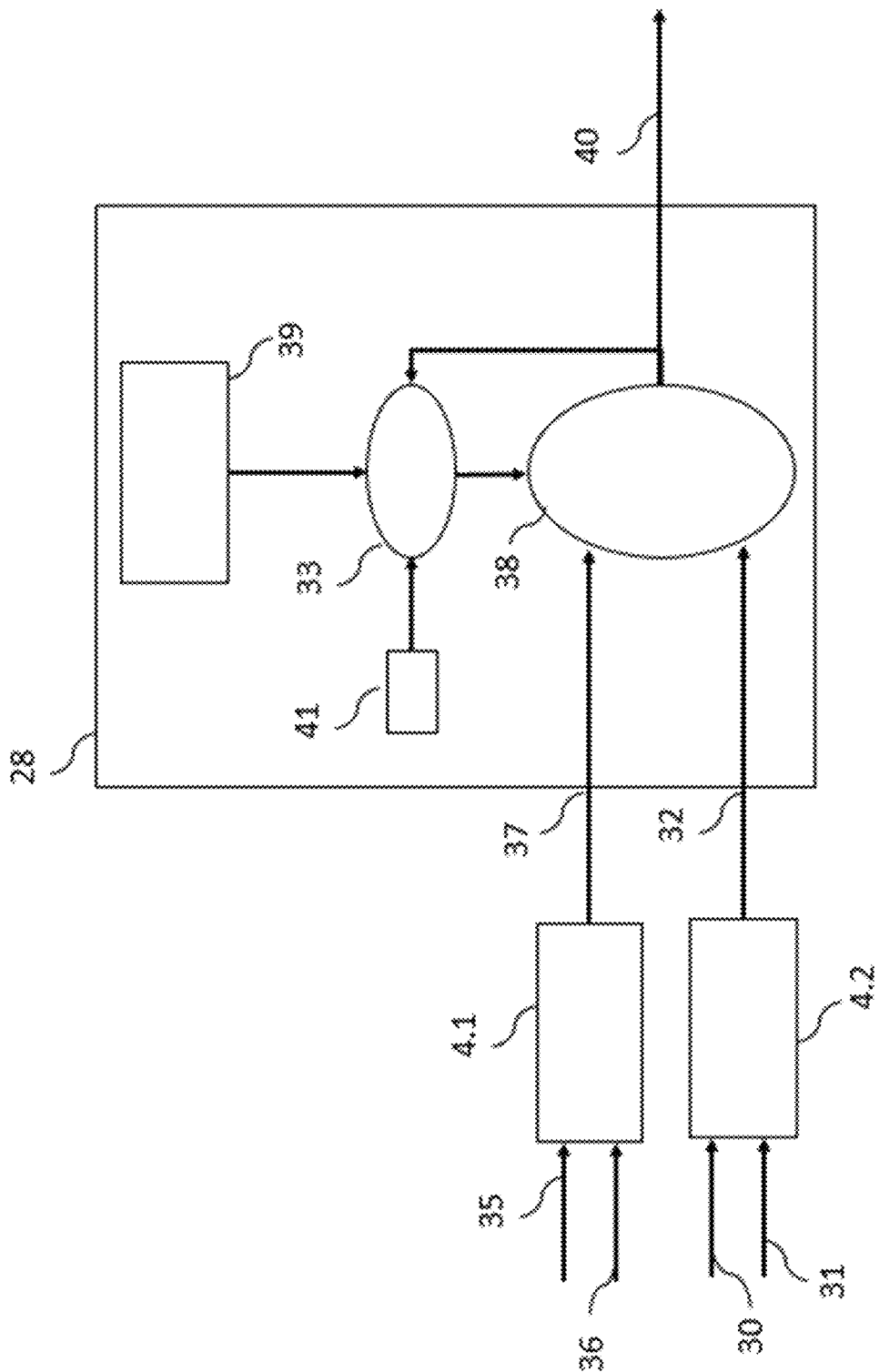
FIG. 9 shows the estimation algorithm, using both flight control system data and electric propulsion system data in the update step.

Generally, as already stated above, the primary data set can be processed by the prediction step, and the secondary data set is processed by the update step (cf. FIG. 7), or vice versa (cf. FIG. 8), or both primary and secondary data sets can be processed by the update step (cf. FIG. 9).

FIG. 7 shows the implementation 27 of a method comprising a Kalman filter algorithm 28 to evaluate data from FCS 4.1 (see FIG. 1) and EPS 4.2 (see FIG. 1) of the VTOL-aircraft 1 (see FIG. 1) in such a way that the uncertainty of an estimation result is equal to or less than that of the data from primary control and secondary control.

As described above, FCS 4.1 receives control inputs 30 (e.g., from a flight controller/law with or without navigation system) and sensor data 31 (e.g., measurements from inertial measurement unit IMU) and generates a first health status vector 32. The first health status vector 32 is calculated using the following steps:

Compute first health status vector 32, based on control input 30 and sensor data 31 (including external wrench 13);

If the vertical force change of the VTOL-aircraft exceeds or falls below a force limit (including an error margin) that is defined according to FIG. 4, a number of failed propulsion units can be determined;

If the yaw torque change exceeds or falls below a yaw torque limit that is defined according to FIG. 5, it can be determined if the failed actuator is in the inner or the outer ring of the VTOL-aircraft and if the failed rotation propulsion unit rotates left or right.

If the pitch and roll torques exceed or fall below their respective limits that are defined according to FIG. 6, it can be determined if the actuator is in front, rear, left or right of the VTOL-aircraft.

The resulting first health status vector 32 comprises values between 0 and 1 that each represent a health status of the respective actuator. The value 0 represents a completely unhealthy actuator, whereas 1 represents a completely healthy actuator.

First health status vector 32 is entered in a prediction step 33 of Kalman filter algorithm 28.

As described above, EPS 4.2 receives control inputs 35 (can be partly or wholly identical with thrust commands, generated by FCS 4.1, cf. FIG. 1) for the operation of propulsion units (cf. FIG. 1) as well as sensor data 36 (e.g., temperature data from sensors S), comprising measurement data of operation parameters of at least one of the propulsion unit. Sensor data 36 is processed in terms of a pre-processing step, generating a second health status vector 37. Second health status vector 37 is calculated within EPS 4.2, using the following steps:

Compute second health status vector 37, based on control input 35 and sensor data 36.

Determine root-mean-square $E_{rms}$ of error $e_i$ between nominal and actual values of rotational speed or other significant characteristic value (such as temperature, torque or power).

If $E_{rms}$ of a propulsion unit is greater than error $e_i$, the according propulsion unit is considered completely unhealthy and its health status if represented by the value 0 in the second health status vector.

If another significant characteristic value exceeds a given low limit value but does not undercut a high limit value, a value between 0 and 1 that represents a health status of the respective actuator. The value 0 represents a completely unhealthy actuator, whereas 1 represents a completely healthy actuator.

If the same significant characteristic value exceeds a high limit value, the value [0,1] is decreased, indicating that the according propulsion unit is in danger.

The resulting first health status vector comprises values [0,1], whereas 0 represents a completely unhealthy actuator and 1 represents a completely healthy actuator.

Prior state knowledge 39, which represents an estimated initial state of the health status, is entered in prediction step 33. An estimated health status 40 is generated by updating the prediction by reducing an error between an estimated health status and the actual health status, provided by an estimated or measured state.

FIG. 8 shows another implementation 27 of a method comprising a Kalman filter algorithm 28 is operated in control system 4 of the VTOL-aircraft 1 according to FIG. 1. In contrast to the method shown in FIG. 7, first health status vector 32, which is based on control inputs 35 and sensor data 36, is entered in update step 38. Accordingly, the prediction of the actual health status that is provided by prediction step 33 is based on second health status vector 37 and prior state knowledge 39. Except for the changed inputs of prediction step 33 and update step 37 compared to FIG. 7, the explanations in FIG. 7 can be applied analogously to the implementation 27 of FIG. 8.

FIG. 9 shows another implementation 27 of a method comprising a Kalman filter algorithm 28 is operated in control system 4 of the VTOL-aircraft 1 according to FIG. 1, where prediction step 38 takes place based on prior state knowledge 39 and linear system dynamics 41, having constant or slowly decaying properties. In this alternative, prediction is simplified, because both first health status vector 32 and second health status vector 37 are entered in update step 38. Except for the changed inputs of prediction step 33 and update step 37 compared to FIGS. 7 and 8, the explanations in FIGS. 7 and 8 can be applied analogously to the implementation 27 of FIG. 9.

The invention claimed is:

1. A method (27) for monitoring a condition of a VTOL-aircraft (1) with a plurality of spatially distributed actuators (2i, 2o), the method comprising:
using a primary control (4.1) for controlling a flight state of the VTOL-aircraft (1) and using at least one secondary control (4.2) for controlling the actuators (2i, 2o) of the VTOL-aircraft (1);
during operation of the VTOL-aircraft (1), generating a primary data set (32) with the primary control (4.1), which is subject to a first uncertainty, and entering said primary data set (32) into an estimation algorithm (28), and generating a secondary data set (37) with the secondary control (4.2), which is subject to a second uncertainty, and entering said secondary data set (37) into the estimation algorithm (28);
the estimation algorithm (28) processing the primary data set (32) and the secondary data set (37) and the estimation algorithm (28) generating an estimation result (40), said estimation result (40) being representative of a condition of the VTOL-aircraft (1), and subjecting said estimation result (40) to a third uncertainty, said third uncertainty is equal to or lower than at least one of the first uncertainty and/or the second uncertainty.

2. The method of claim 1, wherein the plurality of spatially distributed actuators (2i, 2o) comprise propulsion units for at least one of generating propulsion forces or maintaining a spatial position of the VTOL-aircraft (1), and the estimation algorithm (28) generates the estimation result (40) that is representative of the health status of at least one of the actuators (2i, 2o) of the VTOL-aircraft.

3. The method according claim 2, wherein the primary data set (32) is generated at least partially by a motor allocation algorithm, said motor allocation algorithm is configured to determine a nominal thrust distribution provided by the propulsion units in order to at least one of achieve or maintain a desired state of the VTOL-aircraft.

4. The method according to claim 1, wherein the primary control (4.1) operates as a flight control computer and the secondary control (4.2) operates as an engine controller.

5. The method according to claim 1, wherein the primary data (32) set and the secondary data set (37), respectively, represent an identical type of information in a first estimated condition and a second estimated condition.

6. The method of claim 1, wherein the primary data (32) set and the secondary data set (37), respectively, represent a first estimated health status and a second estimated health status of at least one of the actuators (2i, 2o) of the VTOL-aircraft (1), and wherein the first uncertainty is representative of the accuracy or error value of the first estimated health status, and the second uncertainty is representative of the accuracy or error value of the second estimated health status.

7. The method according to claim 1, further comprising the primary control (4.1) generating the primary data set (32) at least partially by estimating a first external wrench in a stationary state of the VTOL-aircraft, and partially by estimating a second external wrench in a non-stationary state of the VTOL-aircraft, that are caused by an action of at least one of the actuators causing a deviation from said stationary state, the first external wrench and the second external wrench each comprising a first total thrust and a second total thrust and a first torque vector and a second torque vector, respectively.

8. The method according to claim 6, further comprising the primary control (4.1) generating the primary data set (32) at least partially by comparison of the first external wrench with the second external wrench, resulting in a first actuator condition vector, said first actuator condition vector comprises values representative of a condition of a respective actuator of the VTOL-aircraft.

9. The method according to claim 1, wherein the secondary data set (37) is generated at least partially by a sensor (IMU, S) used for measuring an operating condition of at least one of the actuators, and a second actuator condition vector is derived from the secondary data set (37), said second actuator condition vector comprises values representative of a condition of a respective one of the actuators of the VTOL-aircraft.

10. The method according to claim 1, wherein the estimation result (40) is configured to determine a relative position of at least one of an abnormally operating or defective one of the actuators (2i, 2o).

11. The method according to claim 1, wherein the estimation algorithm (28) is an optimum estimation algorithm comprising at least one prediction step (33) and at least one update step (38).

12. The method according to claim 11, further comprising estimating a current condition of the VTOL-aircraft (1), including a health status of at least one actuator (2i, 2o) of the VTOL-aircraft, using the prediction step (33) by using a physical model (39) of the VTOL-aircraft and a first sensor data set (32) obtained by at least one first sensor (S, IMU), and updating the estimated current condition of the VTOL-aircraft (1), including the health status of at least one actuator (2i, 2o) of the VTOL-aircraft (1), in an update step, using a second sensor data set (37) obtained by at least one second sensor (S, IMU).

13. The method according to claim 12, wherein the primary data set (32) is processed by the prediction step (33) and the secondary data set (37) is processed by the update step (38), or vice versa.

14. The method according to claim 11, wherein the prediction step (33) is carried out using a linear system model of the VTOL-aircraft condition or actuator health status and an assumed initial condition of the VTOL-aircraft condition or actuator health status, and in which both the primary data set (32) and the secondary data set (37) are entered into the update step (38).

15. A VTOL-aircraft (1) comprising a plurality of spatially distributed actuators (2i,2o) and the system of claim 14.

16. The method according to claim 1, wherein the estimation algorithm (28) determines a moving average estimation from the primary data set (32) and the secondary data set (37), the primary data set (32) and the secondary data set (37) being weighted complementarily to one another accordingly to a heuristically assumed reliability of the primary data set (32) and the secondary data set (37).

17. The method of claim 1, wherein the aircraft is an electrically propelled, autonomous, multi-rotor aircraft.

18. A system (4) for monitoring a condition of a VTOL-aircraft (1) with a plurality of spatially distributed actuators (2i, 2o), the system comprising:
at least one controller with a primary control (4.1) that is configured to be used for controlling a flight state of the VTOL-aircraft (1) and at least one secondary control (4.2) that is configured to be used for controlling the actuators (2i, 2o) of the VTOL-aircraft (1);
during operation of the VTOL-aircraft (1), the primary control (4.1) is configured to generate a primary data set (32), which is subject to a first uncertainty, and the secondary control (4.2) is configured to generate a secondary data set (37), which is subject to a second uncertainty;
an estimation algorithm (28) that is executed on the at least one controller that receives both the primary data set (32) and the secondary data set (37);
the estimation algorithm (28) is configured to process the primary data set (32) and the secondary data set (37) and the estimation algorithm (28) is configured to generate an estimation result (40), said estimation result (40) is representative of a condition of the VTOL-aircraft (1), and said estimation result (40) is subject to a third uncertainty, said third uncertainty is equal to or lower than at least one of the first uncertainty or the second uncertainty.

19. The system of claim 18, wherein the VTOL aircraft is an electrically propelled, autonomous, multi-rotor aircraft.

20. The system of claim 18, wherein the actuators are propulsion units for at least one of generating propulsion forces or for maintaining a spatial position of the VTOL-aircraft (1), the secondary control is for the propulsion units, and the condition of the VTOL-aircraft is a health status of at least one of the actuators (2i, 2o) of the VTOL-aircraft (1).

* * * * *